(12) United States Patent
Saxena et al.

(10) Patent No.: US 11,513,854 B1
(45) Date of Patent: Nov. 29, 2022

(54) RESOURCE USAGE RESTRICTIONS IN A TIME-SERIES DATABASE

(71) Applicant: Amazon Technologies, Inc., Seattle, WA (US)

(72) Inventors: Gaurav Saxena, Seattle, WA (US); Mustafa Ozan Ozen, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 583 days.

(21) Appl. No.: 16/453,914

(22) Filed: Jun. 26, 2019

(51) Int. Cl.
*G06F 9/50* (2006.01)
*G06F 16/2455* (2019.01)
*G06F 16/2458* (2019.01)

(52) U.S. Cl.
CPC .......... *G06F 9/5027* (2013.01); *G06F 9/5088* (2013.01); *G06F 16/2477* (2019.01); *G06F 16/24568* (2019.01)

(58) Field of Classification Search
CPC ............. G06F 9/5027; G06F 16/24568; G06F 16/2477; G06F 9/5088
See application file for complete search history.

(56) References Cited

U.S. PATENT DOCUMENTS

| | | | |
|---|---|---|---|
| 8,132,046 B2 | 3/2012 | Varghese | |
| 8,276,154 B2 * | 9/2012 | Toub | G06F 9/5033 718/106 |
| 8,335,765 B2 | 12/2012 | Sivasubramanian et al. | |
| 8,386,540 B1 | 2/2013 | McAlister et al. | |
| 8,595,547 B1 | 11/2013 | Sivasubramanian et al. | |
| 8,601,112 B1 * | 12/2013 | Nordstrom | G06Q 10/0631 709/224 |
| 9,286,001 B2 | 3/2016 | Skjolsvold et al. | |
| 9,449,122 B2 | 9/2016 | Haas et al. | |
| 9,607,019 B1 | 3/2017 | Swift et al. | |
| 9,607,067 B2 | 3/2017 | Haas et al. | |
| 9,626,374 B2 | 4/2017 | Hirsch et al. | |
| 9,672,257 B2 * | 6/2017 | Tobin | G06F 16/2477 |
| 9,817,727 B2 | 11/2017 | McAlister et al. | |
| 9,836,492 B1 | 12/2017 | Hermanson | |

(Continued)

OTHER PUBLICATIONS

U.S. Appl. No. 16/116,791, filed Aug. 29, 2018, Mustafa Ozan Ozen.

(Continued)

*Primary Examiner* — Jorge A Chu Joy-Davila
(74) *Attorney, Agent, or Firm* — Alexander A. Knapp; Kowert, Hood, Munyon, Rankin & Goetzel, P.C.

(57) ABSTRACT

Methods, systems, and computer-readable media for resource usage restrictions in a time-series database are disclosed. Elements of a plurality of time series are stored into one or more storage tiers of a time-series database. The time series are associated with a plurality of clients of the time-series database. Execution of tasks is initiated using one or more resources of one or more hosts. The time-series elements represent inputs to the tasks. The tasks comprise a first task and a second task. A usage of the one or more resources by the first task is determined to violate one or more resource usage restrictions. Based at least in part on the usage, one or more actions are performed to modify the execution of the first task. The one or more actions increase an amount of the one or more resources available to the second task.

20 Claims, 11 Drawing Sheets

(56) References Cited

U.S. PATENT DOCUMENTS

| | | | |
|---|---|---|---|
| 9,934,107 | B1 | 4/2018 | Chikkanayakanahally et al. |
| 10,007,513 | B2 | 6/2018 | Malladi et al. |
| 10,146,469 | B2 * | 12/2018 | Polkovnikov .......... G06F 3/0649 |
| 2005/0235285 | A1 * | 10/2005 | Monasterio ........... G06F 9/4843 |
| | | | 718/100 |
| 2014/0082612 | A1 * | 3/2014 | Breitgand ............. G06F 9/5005 |
| | | | 718/1 |
| 2015/0381711 | A1 * | 12/2015 | Singh ...................... H04L 41/12 |
| | | | 709/221 |
| 2017/0249649 | A1 * | 8/2017 | Garvey ............. G06K 9/00536 |
| 2018/0309637 | A1 * | 10/2018 | Gill ........................ H04L 41/12 |
| 2021/0117232 | A1 * | 4/2021 | Sriharsha ............... G06F 16/256 |
| 2021/0117889 | A1 * | 4/2021 | Turner ............. G06Q 10/06315 |

OTHER PUBLICATIONS

U.S. Appl. No. 16/176,629, filed Oct. 31, 2018, Dumanshu Goyal.
U.S. Appl. No. 16/216,580, filed Dec. 11, 2018, Dumanshu Goyal.
U.S. Appl. No. 16/199,078, filed Nov. 23, 2018, Timothy A. Rath.
U.S. Appl. No. 16/199,102, filed Nov. 23, 2018, Lonnie J. Princehouse.
U.S. Appl. No. 16/199,103, filed Nov. 23, 2018, Timothy A. Rath.
U.S. Appl. No. 16/219,686, filed Dec. 13, 2018, Dumanshu Goyal.
U.S. Appl. No. 16/267,330, filed Feb. 4, 2019, Dumanshu Goyal.
U.S. Appl. No. 16/287,822, filed Feb. 27, 2019, Dumanshu Goyal.
U.S. Appl. No. 17/349,786, dated Jun. 16, 2021, Sudipto Das.
U.S. Appl. No. 17/234,372, dated Apr. 19, 2021, Evgeniy Retyunskiy.

* cited by examiner

RESOURCE USAGE RESTRICTIONS IN A TIME-SERIES DATABASE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
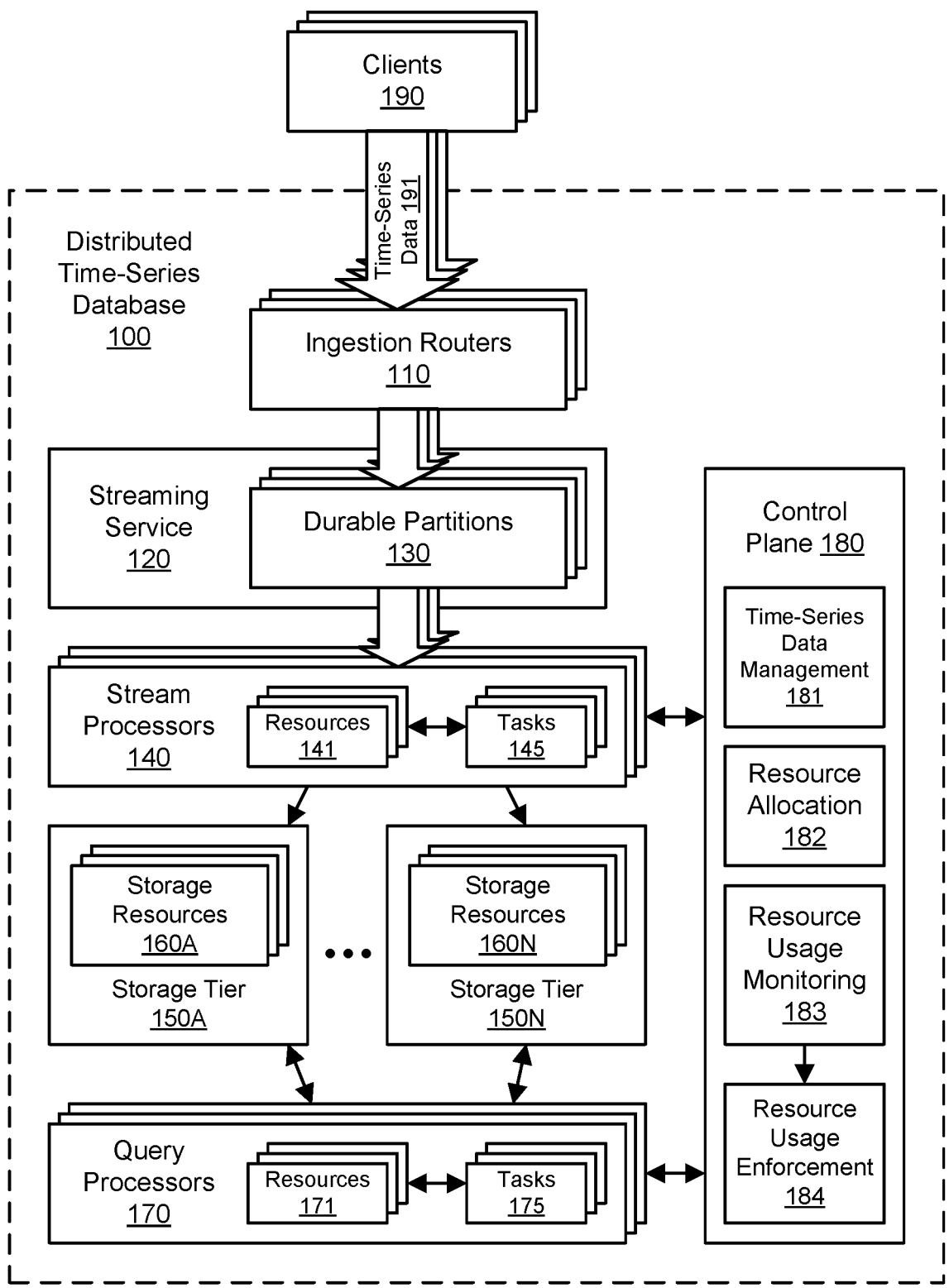
FIG. 1 illustrates an example system environment for resource usage restrictions in a time-series database, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for resource usage restrictions in a time-series database are described. A time-series database may include a set of stream processors, also referred to as writers, that process one or more streams of time-series data in a distributed manner. For example, the stream processors may write elements of time-series data to one or more storage tiers such as a "hot" tier that offers low-latency and high-availability write and read access to a set of distributed storage nodes. The stream processors may also perform tasks such as continuous queries, aggregations, and other computations on time-series data on behalf of clients. Similarly, a set of query processors may perform tasks such as one-time queries, transformations, and other computations on time-series data on behalf of clients. Stream processors and query processors may be referred to as hosts. A given host may have a fixed set of resources such as processor resources, memory resources, storage resources, network resources, and so on. A given host may be used to execute tasks on behalf of multiple clients at a given time. If one task or set of tasks associated with a particular client consumes excessive resources, then tasks for other clients may be negatively impacted by the lack of available resources. To ensure the continued availability of hosts for multiple clients, resource usage restrictions may be applied to individual tasks, time series, and/or clients. For example, resources of hosts such as memory resources and virtual machines may be allocated according to the usage restrictions. As another example, resource usage of tasks may be monitored, and actions such as task termination, task migration, and task throttling may be taken to prevent other tasks from being negatively affected by the excessive resource usage of one task. By enforcing resource usage restrictions, a multi-tenant time-series database may prevent rogue tasks from consuming excessive resources that could be used to execute other tasks.

As one skilled in the art will appreciate in light of this disclosure, embodiments may be capable of achieving certain technical advantages, including some or all of the following: (1) improving the availability of stream processors for performing continuous queries and other tasks in a time-series database by enforcing resource usage limitations on tasks; (2) improving the availability of query processors for performing one-time queries and other tasks in a time-series database by enforcing resource usage limitations on tasks; (3) reducing the performance impact of one task on other tasks performed by stream processors by enforcing resource usage limitations on tasks; (4) reducing the performance impact of one task on other tasks performed by query processors by enforcing resource usage limitations on tasks; (5) improving resource usage in a distributed time-series database by using load-balancing techniques for assigning tasks to hosts; and so on.

FIG. 1 illustrates an example system environment for resource usage restrictions in a time-series database, according to some embodiments. A distributed time-series database 100 may ingest and store time-series data 191 and make the stored data available for queries and other computations and tasks. Elements of the time-series data 191 may be received by the database 100 from clients 190 over time, e.g., as one or more streams of time-series data. Clients 190 may represent various types of client devices that generate or otherwise provide data in various time series to the database 100. A time series may include a set of values that change over time, such as sensor measurements or system metrics, and that are timestamped or otherwise positioned along a temporal axis. For example, a set of client devices 190 may repeatedly gather information such as vibration, temperature, and pressure using sensors. As another example, a set of client devices 190 may detect state transitions, e.g., in a computer network. Client devices 190 that provide the time-series data 191 to the database 100 may be associated with various domains such as Internet of Things (IoT) and "smart home" networks, autonomous vehicles, manufacturing facilities, distribution facilities, computational resources in a multi-tenant provider network, facilities management systems, stock trading systems, and so on. Some time series or hierarchies of time series may include very large numbers of measurements. For example, a multi-tenant provider network may monitor trillions of events per day. As another example, a fulfillment center for an online store may have thousands of sensors that monitor the state of equipment, goods, and software. In order to efficiently ingest, transform, store, and/or query such large quantities of data, the distributed database 100 may employ scaling techniques while keeping the database online for continued ingestion and querying. By decoupling various stages of the distributed database 100 from each other, individual portions of the database may be scaled up or down by a control plane 180 to make better use of computational and storage resources while permitting near-real-time ingestion and querying of time-series data.

The ingested time-series data 191 may represent a large number of individual time series. An individual time series may include a sequence of values or observations (e.g., for a feature of a system or a phenomenon) that can be plotted over time. An individual time series may be uniquely identified by a set of dimensions such as what the observations are measuring, where the observations were measured, client-specified tags such as device model or instance type, and so on. For example, a smart-home device may produce a time series representing measurements of humidity in a particular room at a particular address. The same device may also produce other time series representing measurements at the same location for temperature, dust levels, carbon dioxide, and so on. As another example, a virtual compute instance in a multi-tenant provider network may emit a time series representing CPU utilization over time, another time series representing disk reads over time, yet another time series representing network packets received over time, and so on. Because developers often operate on related time series together, time series that are related (e.g., by physical proximity, by being generated by the same device, and so on) may be clustered using the database 100 for efficient storage and retrieval. To enable such applications, the database 100 may offer a query language that provides filtering according to dimensions such as the device model, instance type, region, address, location, and so on. In one embodiment, any change to such a dimension may produce a new time series in the database 100.

The database 100 may manage a large amount of time-series data throughout the lifecycle of the data. The times-series data 191 may be received at the database 100 using a fleet of ingestion routers 110. The time-series data may typically arrive at the database 100 in time order, but the database may be able to ingest out-of-order data as well. The ingestion routers 110 may divide the data 191 from the clients 190 into non-overlapping partitions 130. In one embodiment, the ingested data may be spatially partitioned along non-overlapping spatial boundaries according to the time series or range of the data, one or more tags associated with the data, the region that produced the data, the category to which the data belongs, and/or other suitable metadata. Ingested time-series data may be mapped to different partitions based on hierarchical clustering in order to achieve better performance of data storage and retrieval. A partition may include one time series or multiple time series.

The partitions 130 may be maintained using persistent storage resources and may be termed durable partitions. In various embodiments, the durable partitions 130 may be provided by a streaming service 120 or by a durable data store. The streaming service 120 may use shards or other divisions to implement the non-overlapping partitions 130. The streaming service 120 or control plane 180 may dynamically increase or decrease the number of partitions based (at least in part) on the amount or rate of ingestion of time-series data. Similarly, the control plane 180 may dynamically increase or decrease the number of ingestion routers 110 based (at least in part) on the amount or rate of ingestion of time-series data. The use of the durable partitions 130 as a staging area may permit the database 100 to decouple ingestion from stream processing and storage. Acknowledgements of requests to add time-series data elements may be sent to the clients 190 upon the successful addition of time-series data elements to the partitions 130.

The database 100 may include hosts such a stream processors 140 and query processors 170. A fleet of stream processors 140 may take the time-series data from the durable partitions 140, potentially process the data in various ways, and add the data to one or more storage tiers 150A-150N. For example, one stream processor may write data from one partition to a "hot" storage tier, and another stream processor may write data from the same partition to a "cold" storage tier. In various embodiments, stream processors may perform reordering, deduplication, aggregation of different time periods, and other transformations on time series data. Stream processors 140 may perform tasks 145 using resources 141 such as processor resources, memory resources, storage resources, network resources, and so on. Tasks 145 may include computations on time-series data. Tasks 145 may include creating materialized views or derived tables based on a partition, such as an aggregation or rollup of a time interval. Tasks 145 may include continuous queries that are performed repeatedly over time, e.g., to create aggregations for each hour or day of a time series as that time period is finalized. Tasks 145 may be requested by clients 190 and performed by the database 100 on behalf of those clients. In one embodiment, clients 190 may submit requests for high-level operations such as continuous queries on particular time series at particular intervals, and the database 100 may implement the requested operations. For example, a client may select a type of continuous query in a user interface or via an API associated with the control plane 180, specify the time-series data to be operated upon, specify the periodicity of a continuous query, and so on.

The data 191 may be routed from the durable partitions 130 to the stream processors 140 according to routing metadata, e.g., that maps different time series or ranges of the data to different stream processors. In one embodiment, a given stream processor may be assigned to one and only one partition at a time. In one embodiment, as the number of partitions increases or decreases based on the amount or rate of ingestion, the number of stream processors may also tend to increase or decrease dynamically.

In one embodiment, the stream processors 140 may organize the time series in tables. The stream processors 140 may also be referred to as writers or table builders. A table may store one or more time series. A table may be a named entity that stores related time series that are usable by the same application. A data point (e.g., an element) in a time series may be stored in a record. Data points or elements of time-series data may be added to the database 100 using application programming interface (API) calls or other programmatic interfaces. In one embodiment, data points for multiple time series (e.g., for related time series generated by the same client device) with the same timestamp may be added by a client using a single API call. A data point may be associated with a timestamp, one or more dimensions (in name-value pairs) representing characteristics of the time series, and a measure representing a variable whose value is tracked over time. Timestamps may be provided by clients or automatically added upon ingestion. Measures may be identified by names and may often have numeric values. Measures may be used by the database 100 in generating aggregations such as min, max, average, and count. For example, a time series related to automobiles may be identified by a unique combination of values for dimensions of a vehicle identification number (VIN), country, state, and city, while measures for such a time series may include the battery state and the miles traveled per day. In one embodiment, dimensions may be indexed for use in queries, and queries may specify time intervals and/or dimensions rather than individual measures.

The various storage tiers 150A-150N may represent different use cases for time-series data. The storage tiers 150A-150N may differ in their performance characteristics, durability characteristics, and cost characteristics. For example, the database 100 may include a hot tier (such as tier 150A) that offers the lowest latency by storing recent time-series data in volatile memory resources (e.g., random access memory) across a distributed set of storages nodes. As another example, the database 100 may include a cold tier that offers higher latency (but a lower cost) by storing a longer interval of time-series data using persistent storage resources such as disk drives. The database 100 may include other tiers such as a warm tier that stores recent time-series data in nonvolatile storage resources (e.g., solid-state drives) across a distributed set of storages nodes, a frozen tier that stores even older time-series data in sequential access storage media, and so on. Based on their needs and budgets, users of the time-series database 100 may select and configure one or more of the storage tiers 150A-150N for storage of their time-series data.

In one embodiment, the database 100 may represent a container of tables and policies, such as retention policies. Policies may be applied at the database level for all tables or may be overridden for individual tables. The database 100 may offer a control plane 180 that permits users (e.g., developers of applications) and other systems to perform management and modeling of time series data. For example, a component 181 for time-series data management of the control plane 180 may offer APIs for creating, deleting, and listing tables (or entire databases); describing tables and policies; creating and updating policies and associating policies with tables; listing series within a table; and so on. A retention policy may determine the time interval for which an element of time-series data is kept in a particular tier; beyond that time interval, the time-series data may expire and may be deleted from the tier. Different tiers may differ in their retention policies for time-series data. Tables may also differ in their retention policies. In one embodiment, for example, the database 100 may have default retention periods of three hours for the hot tier and one year for the cold tier. In one embodiment, costs may be assessed to clients for the use of the database 100 to store their time-series data, and the per-measure costs assessed for the hot tier may be greater than the per-measure costs for the cold tier. Accordingly, clients 190 may adjust the retention policies to reach a balance between performance (e.g., query latency) and cost.

The time-series data may be deemed immutable once written to a particular storage tier, e.g., such that new values may be appended to a time series but existing values may not be deleted (except for expiration based on a retention policy). Using a fleet of query processors 170, queries of time-series data may be performed for particular time intervals. Query processors 170 may perform tasks 175 using resources 171 such as processor resources, memory resources, storage resources, network resources, and so on. Tasks 175 may include one-time queries of time-series data in one or more storage tiers 150A-150N, transformations of time-series data, and other computations. The database 100 may enable specialized mathematical functions such as interpolation, approximation, and smoothing to be performed on time-series data, e.g., in order to find trends and patterns. By contrast, traditional relational database management systems may require developers to write complex application code in order to perform such functions. By interacting with the query processors 170, various applications may use the database 100 to perform analysis of time-series data. For example, machine learning and machine vision applications may use time-series data managed by the database 100.

In some embodiments, the database 100 may determine and enforce resource usage restrictions so that individual tasks (such as tasks 145 and 175) are not permitted to consume excessive resources and/or negatively affect other tasks. A given host (such as one of the stream processors 140 or query processors 170) may have a fixed set of resources (such as resources 141 or 171) such as processor resources, memory resources, storage resources, network resources, and so on. A given host may be used to execute tasks on behalf of multiple clients at a given time. If one task or set of tasks associated with a particular client consumes excessive resources, then tasks for other clients may be negatively impacted by the lack of available resources. To ensure the continued availability of hosts for multiple clients, resource usage restrictions may be applied to individual tasks, time series, and/or clients. Resource usage restrictions may represent upper bounds for processor resources, memory resources, storage resources, network resources, and so on.

In one embodiment, using a component 182 for resource allocation, resources of hosts may be allocated according to the usage restrictions. For example, a portion of memory (e.g., RAM) at a host may be allocated for a given task, and that allocation may represent an upper bound of the memory resource that the task cannot exceed. Similarly, a portion of local storage (e.g., disk-based storage) at a host may be allocated for a given task, and that allocation may represent an upper bound of the storage resource that the task cannot exceed. As another example, a virtual machine may be provisioned with fixed resources such that a task executed using that virtual machine cannot exceed those fixed resources. As yet another example, the resource allocation 182 may interact with an operating system at a host to reserve one processor core or allocate a slice of one processor core for a given task. In one embodiment, the resource allocation 182 may include load-balancing techniques to assign particular hosts for particular tasks. For example, the resource allocation 182 may use a round-robin approach, a least-connections (or least-tasks) approach, or other suitable approaches that optimize resource usage across a set of hosts.

In some embodiments, the resource allocation 182 or another component of the control plane 180 may determine resource usage restrictions based (at least in part) on predictive analysis. For example, the control plane 180 may determine one or more characteristics of a requested task, determine one or more prior tasks with similar characteristics, and predict the resource usage of the requested task based (at least in part) on the historical usage of the similar task(s). The control plane 180 may maintain a repository of historical resource usage data to assist in such predictive analysis. In one embodiment, the control plane 180 may use machine-learning techniques to predict the resource usage of a requested task, e.g., based (at least in part) on historical resource usage trends. Dynamic allocation of resources 141 and 171 may be performed according to the predictive analysis such that allocated resources may have boundaries that accommodate anticipated usage but do not allow tasks to exceed the anticipated usage by a wide margin.

In one embodiment, using a component 183 for resource usage monitoring, resource usage of tasks 145 and 175 may be monitored. The resource usage monitoring 183 may use any suitable techniques or services to obtain and analyze metrics indicating the usage of various resources 141 and 171 by various tasks 145 and 175. For example, the resource usage monitoring 183 may determine how much memory (e.g., RAM) or storage (e.g., hard drive or flash-based storage) a particular task is using at a given host based on one or more metrics provided by an operating system on the host. As another example, the resource usage monitoring 183 may determine an amount of computational resources that a particular task is using at a given host based on one or more metrics provided by an operating system on the host. The monitoring 183 may use metrics from one or more sources, e.g., from individual hosts themselves and/or from a service that reports on resource usage across a set of hosts. The resource usage monitoring 183 may compare such metrics against predetermined thresholds representing the resource usage restrictions. If the resource consumption of a particular task exceeds a resource usage restriction, then the database 100 may take one or more actions to enforce the restriction.

In one embodiment, using a component 184 for resource usage enforcement, actions such as task termination, task migration, and task throttling may be taken to prevent other tasks from being negatively affected by the excessive resource usage of one task. Task termination may involve discontinuing execution of a task whose resource usage exceeds a resource usage restriction. The control plane 180 may notify the corresponding client of the termination due to excessive resource usage. The host at which the task was terminated may be left with more available resources for execution of other tasks. Task migration may involve suspending a task whose resource usage exceeds a resource usage restriction and transferring that task to a different host where its execution is then resumed. For example, the task may be migrated to a host with greater resources or a host that has more available resources. The host from which the task was migrated may be left with more available resources for execution of other tasks. In one embodiment, the task migration may represent a load-balancing approach to assign particular hosts for particular tasks. Task throttling may involve delaying execution of a task, e.g., until a total resource usage for a given client or given time series has dropped sufficiently. Task throttling may be performed to enforce client-based usage restrictions for multiple tasks requested by the same client and/or time-series-based usage restrictions for multiple tasks requested for the same time series. By enforcing resource usage restrictions, a multi-tenant time-series database 100 may prevent rogue tasks from consuming excessive resources that could be used to execute other tasks.

In one embodiment, one or more components of the distributed database 100, such as hosts 140 and 170, other compute instances, and/or storage resources, may be implemented using resources of a provider network. For example, the resources 141 and/or 171 may be provisioned from the provider network as needed for tasks 145 and/or 175. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the ingestion routers 110, durable partitions 130, stream processors 140, storage resources 160A-160N, and/or query processors 170. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the distributed database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. In one embodiment, portions of the functionality of the provider network, such as the distributed database 100, may be offered to clients in exchange for fees.

In one or more of the storage tiers such as tier 150A, the time-series data may be partitioned into a set of tiles along non-overlapping temporal and spatial boundaries. A tile may thus represent a partition of time-series data within a time range (between a starting time and an ending time) and within a range of keys. The storage resources 160A for such a tier 150A may also include a set of storage nodes that are distributed across various data centers, availability zones, or other logical or geographical locations. A tile may be replicated across the storage nodes with a group of replicas (e.g., three replicas) that are eventually consistent without using a server-side consensus mechanism.

Figure 7:
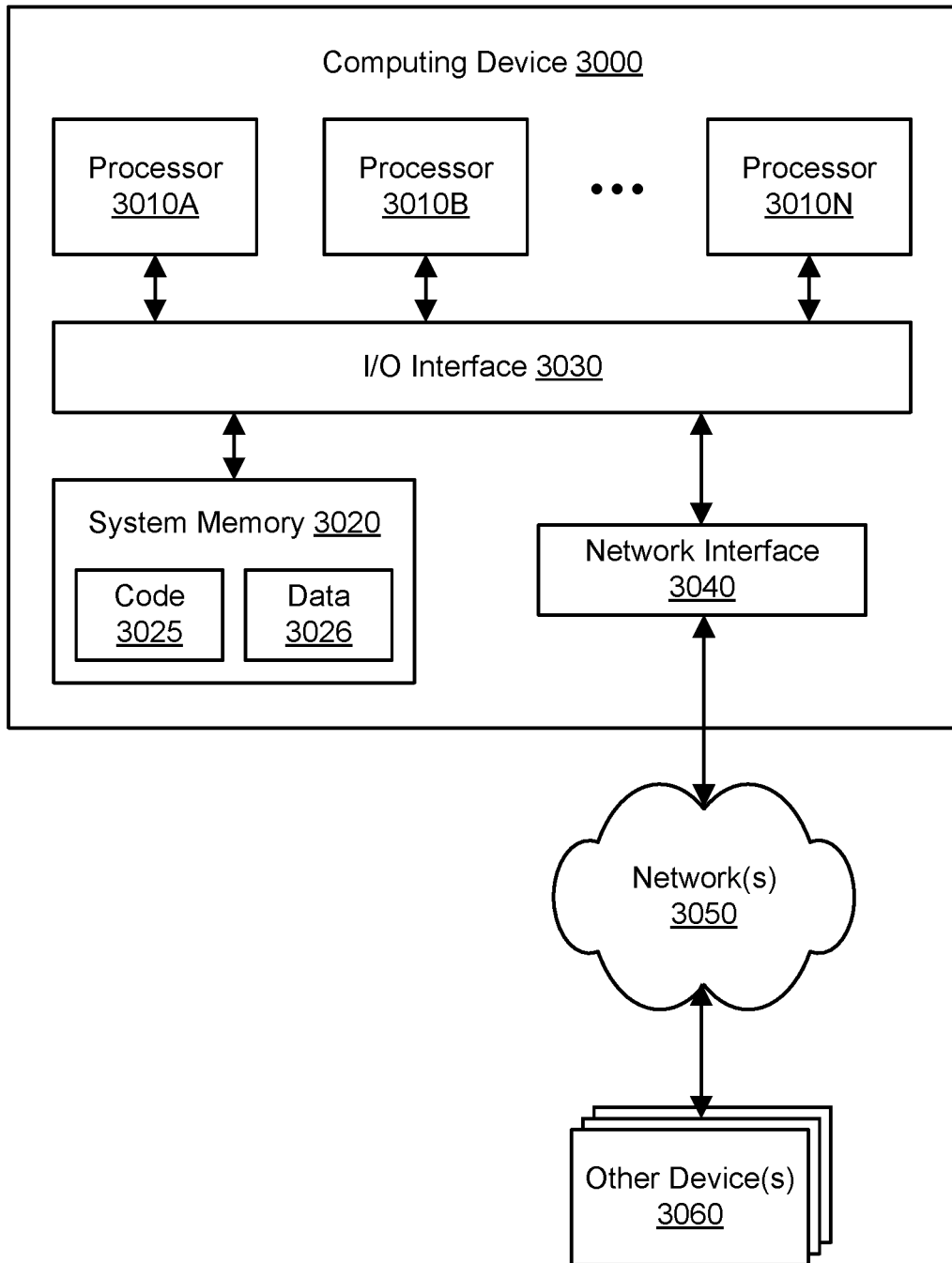
FIG. 7 illustrates an example computing device that may be used in some embodiments.

In various embodiments, components of the distributed database 100, such as the ingestion routers 110, streaming service 120, stream processors 140, storage resources 160A-160N, query processors 170, and/or control plane 180 may be implemented using any suitable number and configuration of computing devices, any of which may be implemented by the example computing device 3000 illustrated in FIG. 7. In some embodiments, the computing devices may be located in any suitable number of data centers or geographical locations. In various embodiments, at least some of the functionality of the distributed database 100 may be provided by the same computing device or by different computing devices. In various embodiments, if any of the components of the distributed database 100 are implemented using different computing devices, then the components and their respective computing devices may be communicatively coupled, e.g., via one or more networks. Any of the components of the distributed database 100 may represent any combination of software and hardware usable to perform their respective functions. In some embodiments, operations implemented by the distributed database 100 may be performed automatically, e.g., without a need for user initiation or user intervention after an initial configuration stage, and/or programmatically, e.g., by execution of program instructions on at least one computing device. In some embodiments, the distributed database 100 may include additional components not shown, fewer components than shown, or different combinations, configurations, or quantities of the components shown.

Clients 190 of the distributed database 100 may represent external devices, systems, or entities with respect to the database. In one embodiment, the client devices may be implemented using any suitable number and configuration of computing devices, any of which may be implemented by the example computing device 3000 illustrated in FIG. 7. Clients 190 may convey network-based service requests to the ingestion router fleet 110 via one or more networks, e.g., to supply a stream of data for processing using the stream processors 140 and storage in the storage tiers 150A-150N. The network(s) may encompass any suitable combination of networking hardware and protocols necessary to establish network-based communications between client devices 190 and the distributed database 100. For example, the network (s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the distributed database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database 100. In one embodiment, client devices may communicate with the distributed database 100 using a private network rather than the public Internet. In various embodiments, the various components of the distributed database 100 may also communicate with other components of the distributed database using one or more network interconnects.

Figure 2:
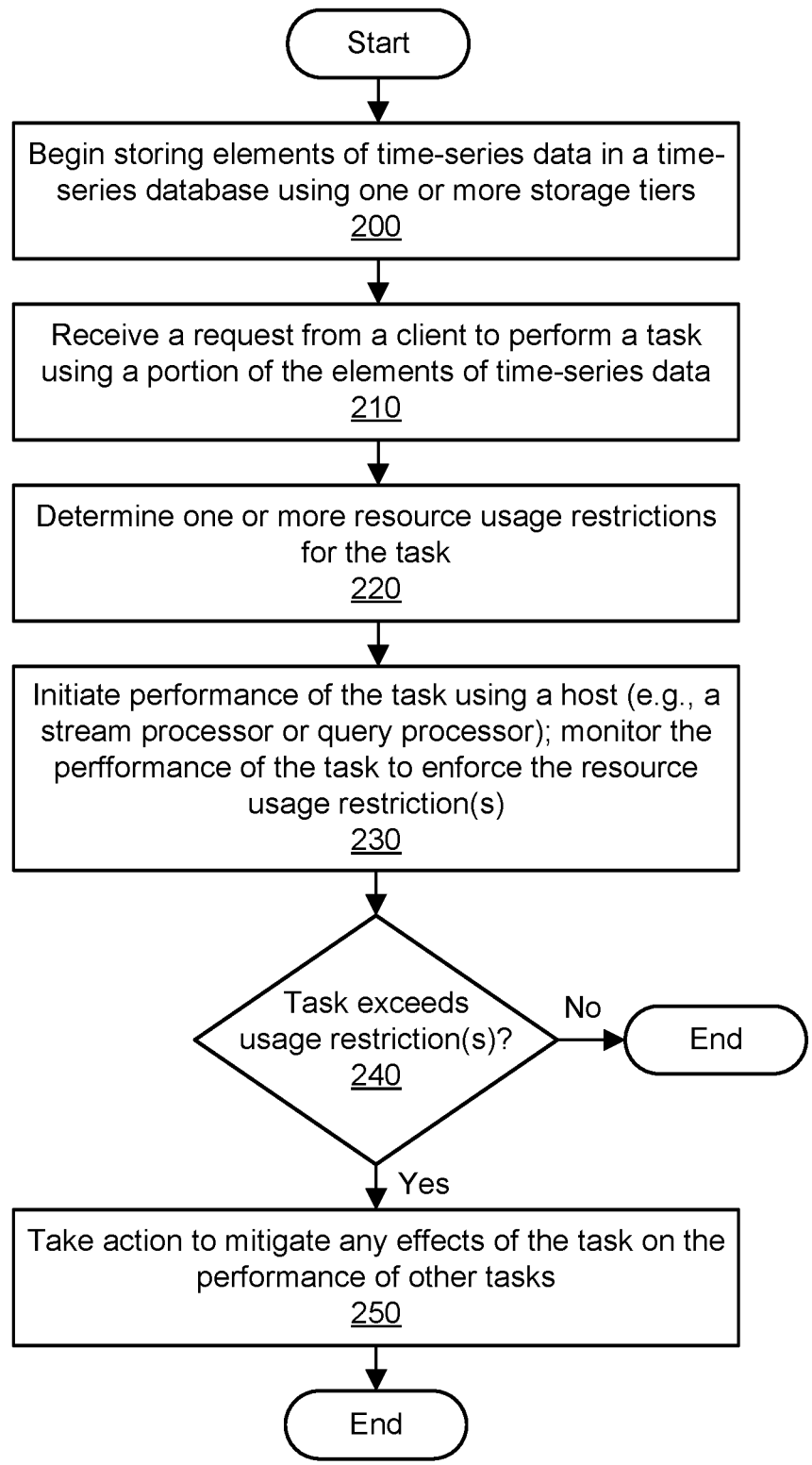
FIG. 2 is a flowchart illustrating a method for resource usage restrictions in a time-series database, according to some embodiments.

FIG. 2 is a flowchart illustrating a method for resource usage restrictions in a time-series database, according to some embodiments. As shown in 200, the method may begin storing elements of time-series data in one or more storage tiers of a time-series database. A fleet of stream processors may take the time-series data from durable partitions, potentially process the data in various ways, and add the data to one or more storage tiers. For example, one stream processor may write data from one partition to a "hot" storage tier, and another stream processor may write data from the same partition to a "cold" storage tier.

As shown in 210, a request may be received by the database from a client to perform a task using at least a portion of the elements of time-series data. Tasks may include computations on time-series data by hosts such as stream processors and query processors. Tasks performed by stream processors may include creating materialized views or derived tables based on a partition, such as an aggregation or rollup of a time interval. Tasks performed by stream processors may include continuous queries that are performed repeatedly over time, e.g., to create aggregations for each hour or day of a time series as that time period is finalized. Continuous queries may be performed as time-series data arrives at a stream processor. Tasks performed by query processors may include one-time queries of time-series data in one or more storage tiers, transformations of time-series data, and other computations. Tasks may be requested by clients and performed by the database on behalf of those clients. In one embodiment, clients may submit requests for high-level operations such as continuous queries on particular time series at particular intervals, and the database may implement the requested operations. For example, a client may select a type of continuous query in a user interface or via an API associated with a control plane, specify the time-series data to be operated upon, specify the periodicity of a continuous query, and so on.

As shown in 220, one or more resource usage restrictions may be determined for the task. Hosts such as stream processors and query processors may perform tasks using resources such as processor resources, memory resources, storage resources, network resources, and so on. A given host may be used to execute tasks on behalf of multiple clients at a given time. If one task or set of tasks associated with a particular client consumes excessive resources, then tasks for other clients may be negatively impacted by the lack of available resources. To ensure the continued availability of hosts for multiple clients, resource usage restrictions may be applied to individual tasks, time series, and/or clients. Resource usage restrictions may represent upper bounds for processor resources, memory resources, storage resources, network resources, and so on. In one embodiment, resources of hosts may be allocated according to the usage restrictions. For example, a portion of memory (e.g., RAM) at a host may be allocated for a given task, and that allocation may represent an upper bound of the memory resource that the task cannot exceed. Similarly, a portion of local storage (e.g., disk-based storage) at a host may be allocated for a given task, and that allocation may represent an upper bound of the storage resource that the task cannot exceed. As another example, a virtual machine may be provisioned with fixed resources such that a task executed using that virtual machine cannot exceed those fixed resources. As yet another example, the control plane of the time-series database may interact with an operating system at a host to reserve one processor core or allocate a slice of one processor core for a given task As shown in 230, performance of the task may be initiated using a host such as a stream processor or query processor. The performance of the task may be monitored to enforce the resource usage restriction(s). For example, the resource usage monitoring may determine how much memory (e.g., RAM) or storage (e.g., hard drive or flash-based storage) a particular task is using at a given host. As another example, the resource usage monitoring may determine an amount of computational resources that a particular task is using at a given host. The resource usage monitoring may compare such metrics against predetermined thresholds representing the resource usage restrictions.

As shown in 240, the method may determine, based on the monitoring, whether the task exceeds any of the resource usage restriction(s) associated with that task (or client or time series). If not, then the resource usage enforcement may not interfere with execution of the task, and the task may be permitted to end by generating a result (e.g., a query result, aggregation, transformation, and so on). If the task does exceed at least one of the resource usage restriction(s), then as shown in 250, the resource usage enforcement may take one or more action(s) to mitigate any negative effects of the task on the performance of other tasks. The action(s) may increase the amount of resources available to other tasks. The action(s) may reduce a performance degradation of other tasks, e.g., where the degradation was attributable to the task whose execution exceeded the resource usage restrictions. The action(s) may involve modifying the execution of the task that exceeded the restrictions. For example, actions such as task termination, task migration, and task throttling may be taken to prevent other tasks from being negatively affected by the excessive resource usage of one task. Task termination may involve discontinuing execution of a task whose resource usage exceeds a resource usage restriction. Task migration may involve suspending a task whose resource usage exceeds a resource usage restriction and transferring that task to a different host where its execution is then resumed. Task throttling may involve delaying execution of a task, e.g., until a total resource usage for a given client or given time series has dropped sufficiently. By enforcing resource usage restrictions, a multi-tenant time-series database may prevent rogue tasks from consuming excessive resources that could be used to execute other tasks.

Figure 3A:
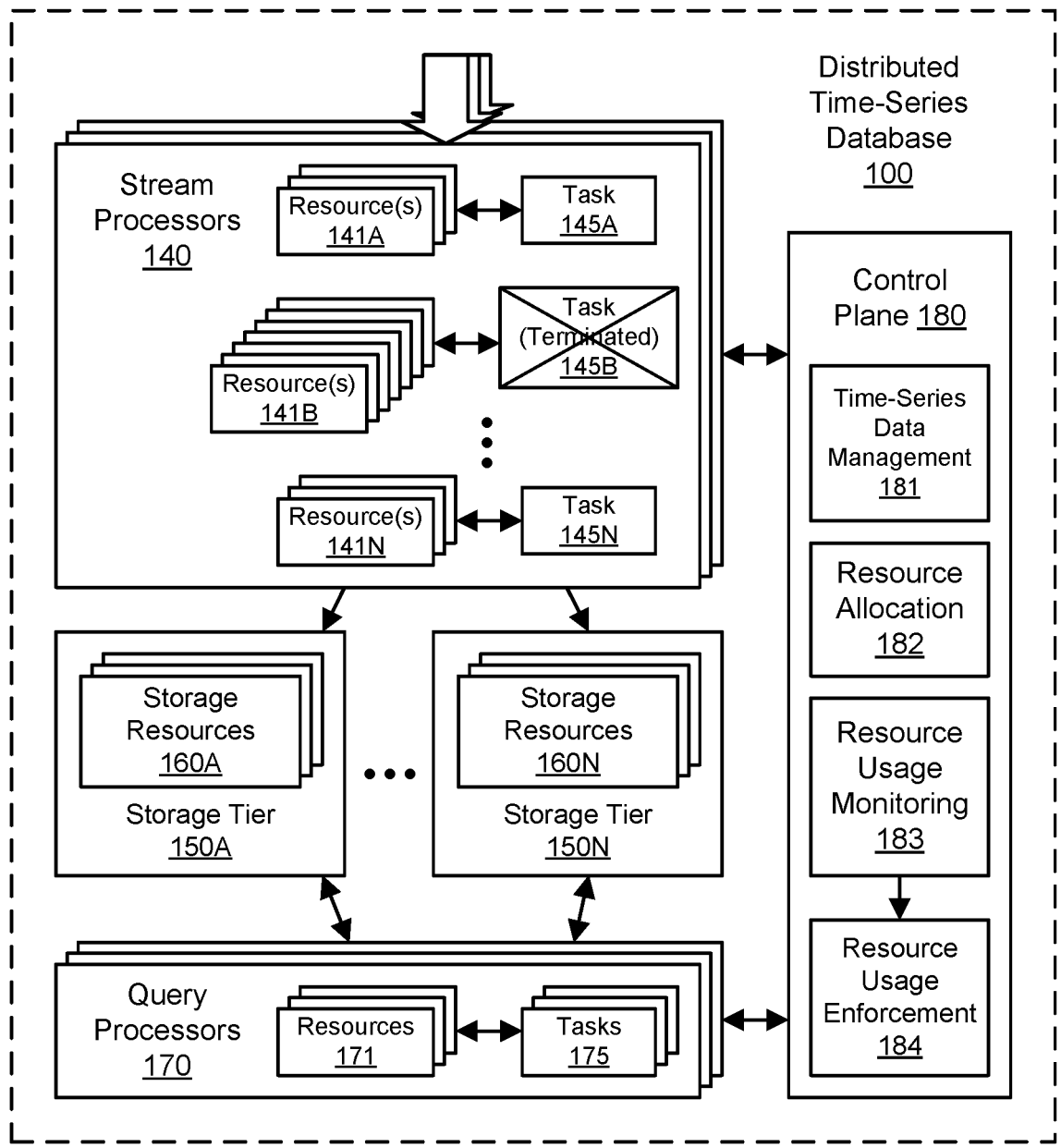
FIG. 3A illustrates further aspects of the example system environment for resource usage restrictions in a time-series database, including termination of tasks performed by stream processors, according to some embodiments.

FIG. 3A illustrates further aspects of the example system environment for resource usage restrictions in a time-series database, including termination of tasks performed by stream processors, according to some embodiments. In one embodiment, using a component 184 for resource usage enforcement, actions such as task termination may be taken to prevent other tasks from being negatively affected by the excessive resource usage of one task. As shown in the example of FIG. 3A, a set of one or more stream processors 140 may be used for concurrent execution of a set of tasks including task 145A and task 145B through task 145N. Task 145A may consume a set of resources 141A, task 145B may consume a set of resources 141B, and task 145N may consume a set of resources 141N. The resource usage monitoring 183 may determine that task 145B is consuming an excessive amount of resources 141B relative to one or more resource usage restrictions associated with that task. The database 100 may terminate that task 145B to enforce the resource usage restriction(s). Task termination may involve discontinuing execution of the task 145B whose resource usage exceeds a resource usage restriction. The control plane 180 may notify the corresponding client of the termination due to excessive resource usage. The host at which the task 145B was terminated may be left with more available resources for execution of other tasks.

Figure 3B:
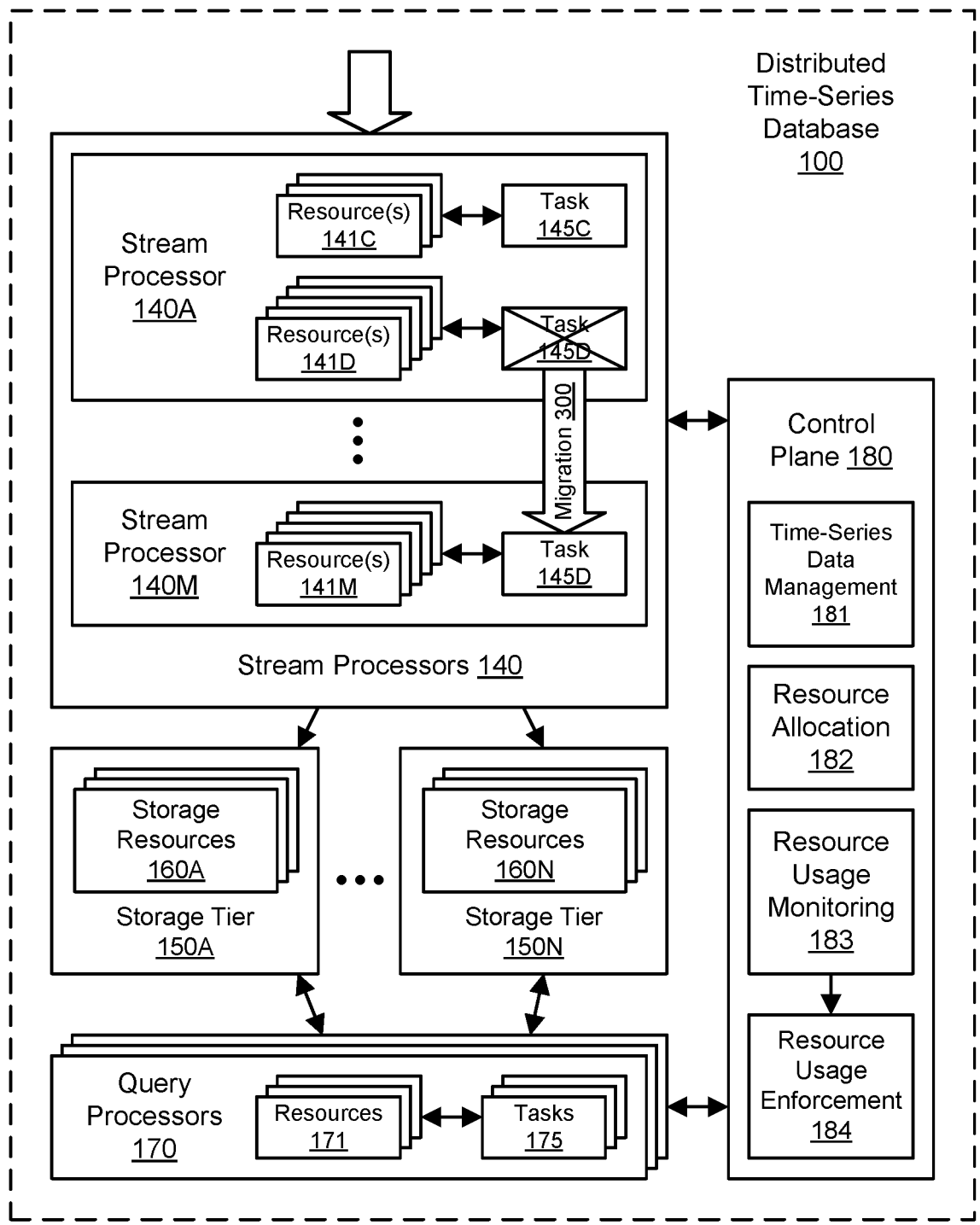
FIG. 3B illustrates further aspects of the example system environment for resource usage restrictions in a time-series database, including migration of tasks performed by stream processors, according to some embodiments.

FIG. 3B illustrates further aspects of the example system environment for resource usage restrictions in a time-series database, including migration of tasks performed by stream processors, according to some embodiments. In one embodiment, using a component 184 for resource usage enforcement, actions such as task migration, may be taken to prevent other tasks from being negatively affected by the excessive resource usage of one task. As shown in the example of FIG. 3B, one stream processor 140A may be used for concurrent execution of a set of tasks including task 145C and task 145D. Task 145C may consume a set of resources 141C, and task 145D may consume a set of resources 141D. The resource usage monitoring 183 may determine that task 145D is consuming an excessive amount of resources 141D relative to one or more resource usage restrictions associated with that task. The database 100 may migrate that task 145D to another stream processor 140M to enforce the resource usage restriction(s). Task migration 300 may involve suspending the task 145D whose resource usage exceeds a resource usage restriction and transferring that task to a different host 140M where its execution is then resumed using resources 141M. For example, the task 145D may be migrated to a host 140M with greater resources or a host that has more available resources. The host 140A from which the task 145D was migrated may be left with more available resources for execution of other tasks.

Figure 3C:
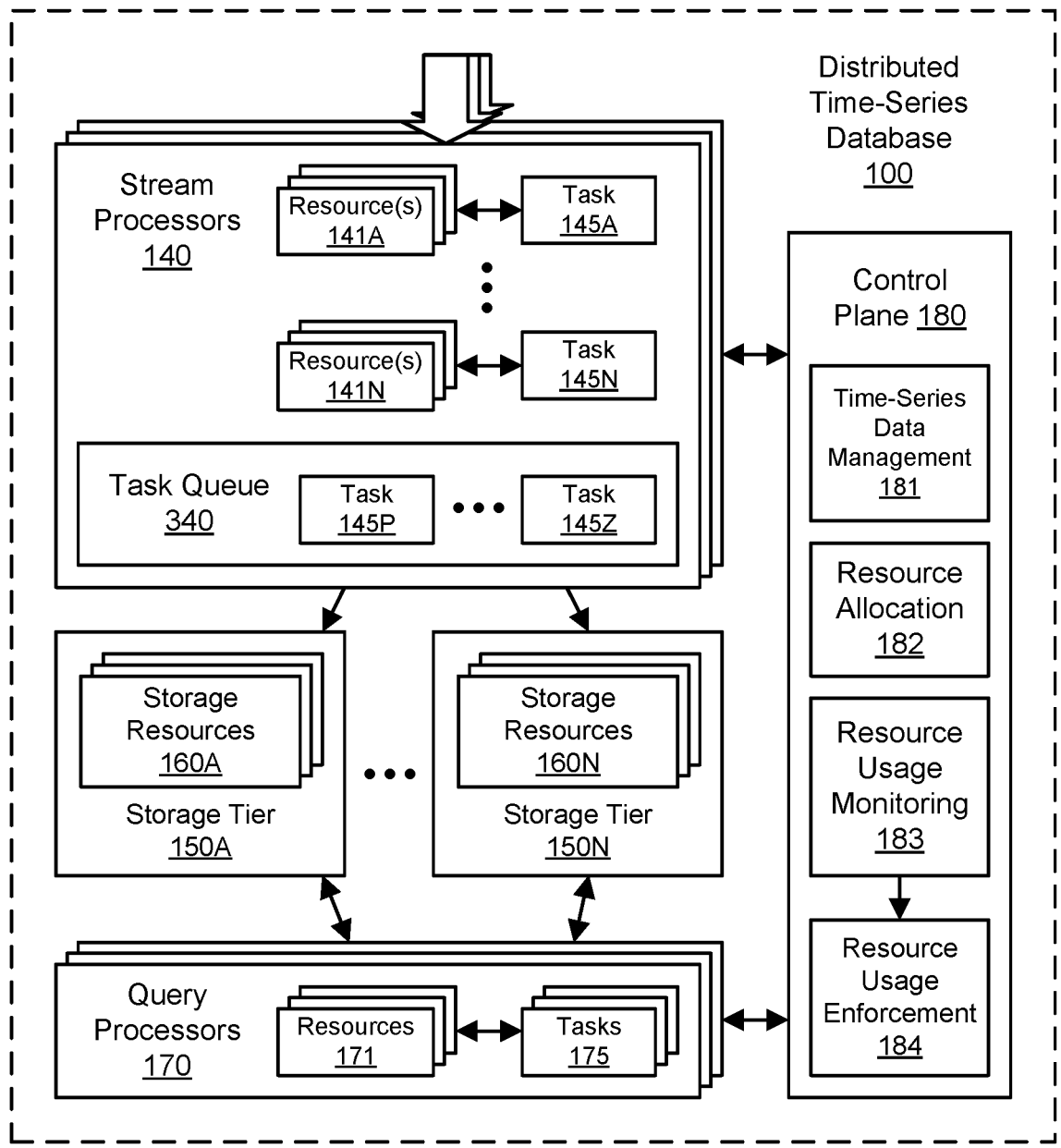
FIG. 3C illustrates further aspects of the example system environment for resource usage restrictions in a time-series database, including delaying of tasks performed by stream processors, according to some embodiments.

FIG. 3C illustrates further aspects of the example system environment for resource usage restrictions in a time-series database, including delaying of tasks performed by stream processors, according to some embodiments. In one embodiment, using a component 184 for resource usage enforcement, actions such as task throttling may be taken to prevent other tasks from being negatively affected by the excessive resource usage of one task. As shown in the example of FIG. 3C, a set of stream processors 140 may be used for concurrent execution of a set of tasks including tasks 145A through 145N. Task 145A may consume a set of resources 141A, and task 145N may consume a set of resources 141N. The resource usage monitoring 183 may determine that one or more tasks associated with a given client or a given time series are consuming an excessive amount of resources relative to one or more resource usage restrictions associated with that client or time series. The database 100 may throttle or delay additional tasks associated with that client or time series to enforce the resource usage restriction(s). As shown in FIG. 3C, a task queue 340 may be associated with the fleet of stream processors 140. The task queue 340 may store any tasks such as task 145P through task 145Z whose execution is being delayed, e.g., to enforce resource usage restrictions. Task throttling may involve delaying execution of a task, e.g., until a total resource usage for a given client or given time series has dropped sufficiently. Task throttling may be performed to enforce client-based usage restrictions for multiple tasks requested by the same client and/or time-series-based usage restrictions for multiple tasks requested for the same time series.

Figure 4A:
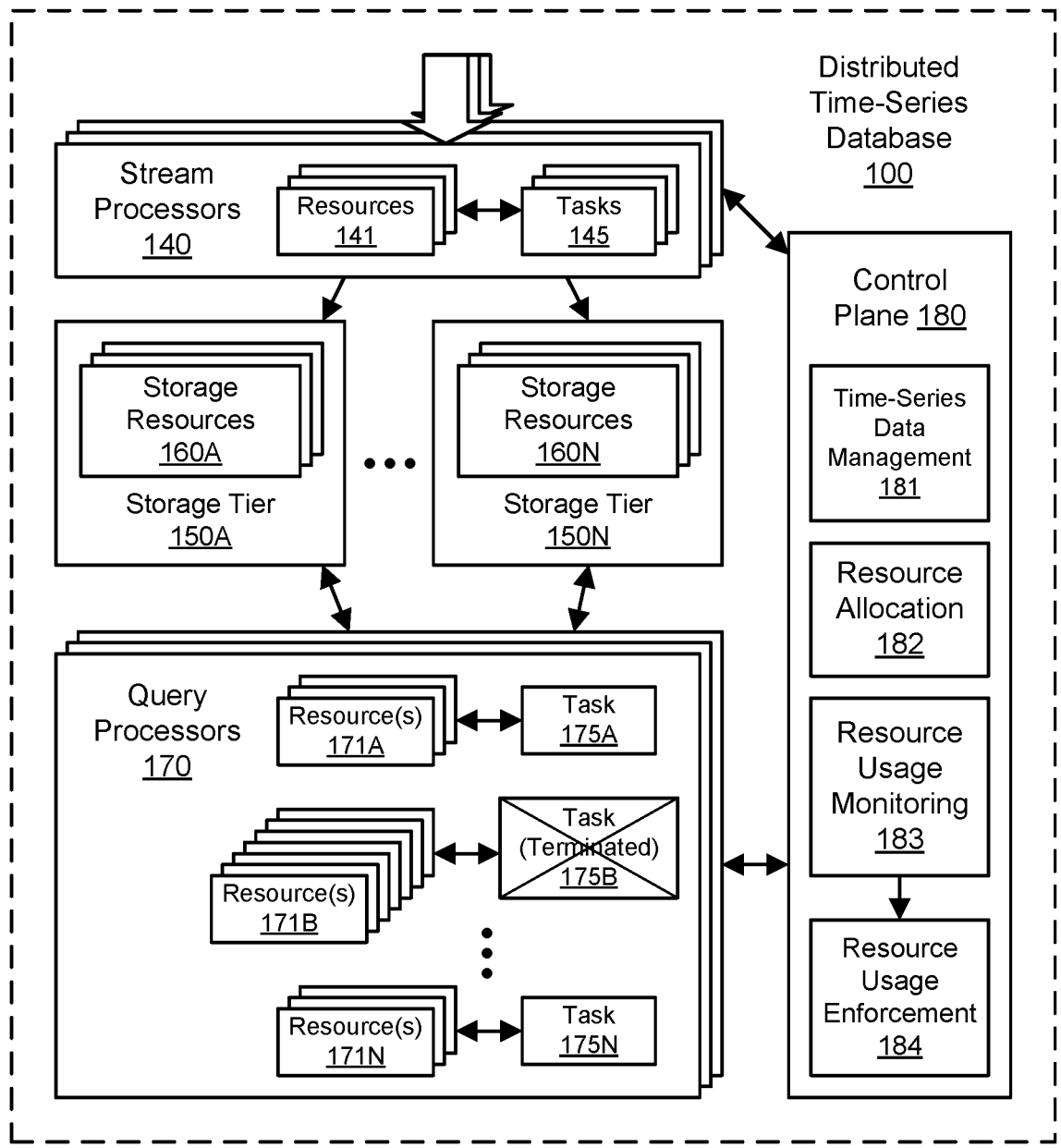
FIG. 4A illustrates further aspects of the example system environment for resource usage restrictions in a time-series database, including termination of tasks performed by query processors, according to some embodiments.

FIG. 4A illustrates further aspects of the example system environment for resource usage restrictions in a time-series database, including termination of tasks performed by query processors, according to some embodiments. In one embodiment, using a component 184 for resource usage enforcement, actions such as task termination may be taken to prevent other tasks from being negatively affected by the excessive resource usage of one task. As shown in the example of FIG. 4A, a set of one or more query processors 170 may be used for concurrent execution of a set of tasks including task 175A and task 175B through task 175N. Task 175A may consume a set of resources 171A, task 175B may consume a set of resources 171B, and task 175N may consume a set of resources 171N. The resource usage monitoring 183 may determine that task 175B is consuming an excessive amount of resources 171B relative to one or more resource usage restrictions associated with that task. The database 100 may terminate that task 175B to enforce the resource usage restriction(s). Task termination may involve discontinuing execution of the task 175B whose resource usage exceeds a resource usage restriction. The control plane 180 may notify the corresponding client of the termination due to excessive resource usage. The host at which the task 175B was terminated may be left with more available resources for execution of other tasks.

Figure 4B:
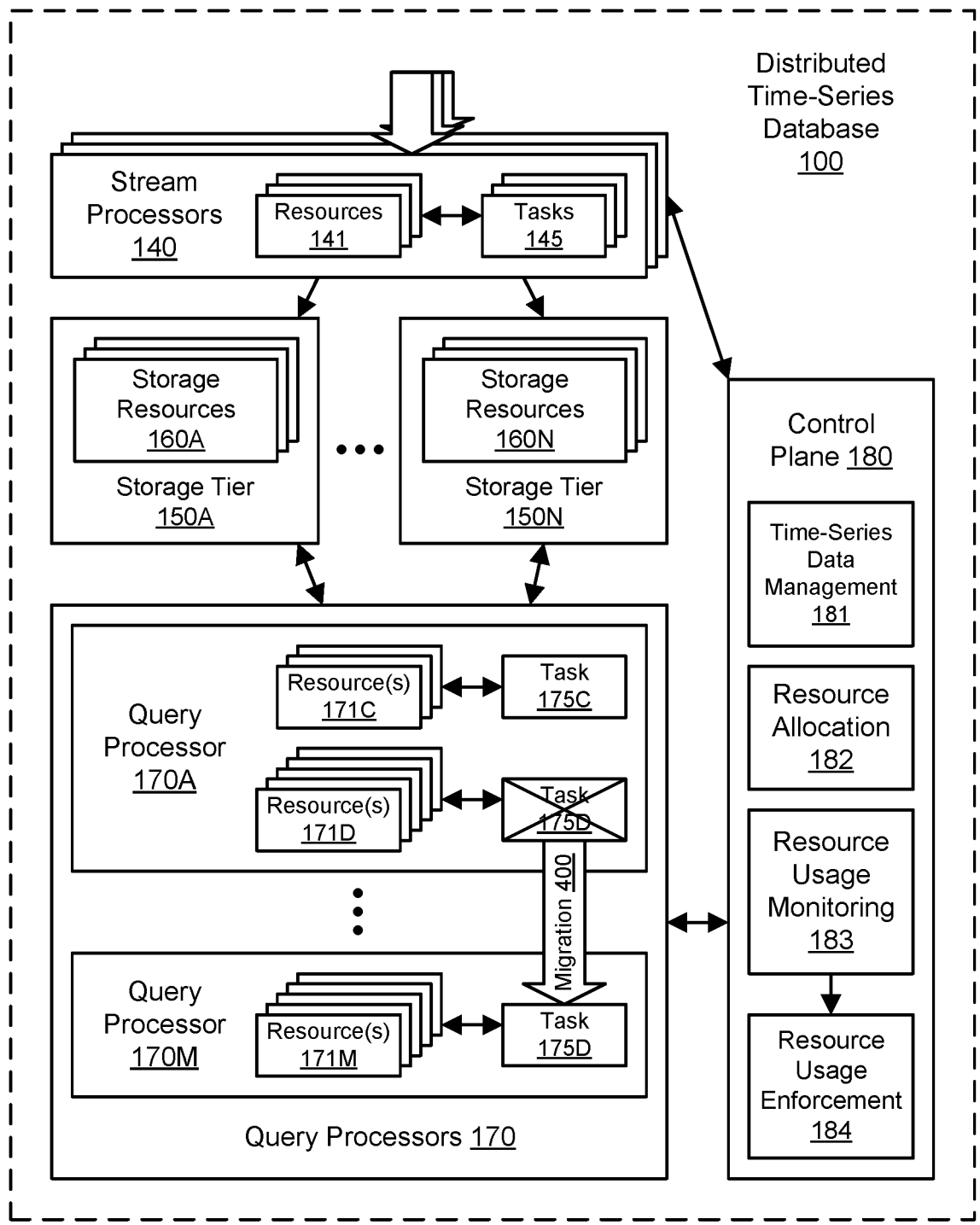
FIG. 4B illustrates further aspects of the example system environment for resource usage restrictions in a time-series database, including migration of tasks performed by query processors, according to some embodiments.

FIG. 4B illustrates further aspects of the example system environment for resource usage restrictions in a time-series database, including migration of tasks performed by query processors, according to some embodiments. In one embodiment, using a component 184 for resource usage enforcement, actions such as task migration, may be taken to prevent other tasks from being negatively affected by the excessive resource usage of one task. As shown in the example of FIG. 4B, one query processor 170A may be used for concurrent execution of a set of tasks including task 175C and task 175D. Task 175C may consume a set of resources 171C, and task 175D may consume a set of resources 171D. The resource usage monitoring 183 may determine that task 175D is consuming an excessive amount of resources 171D relative to one or more resource usage restrictions associated with that task. The database 100 may migrate that task 175D to another query processor 170M to enforce the resource usage restriction(s). Task migration 400 may involve suspending the task 175D whose resource usage exceeds a resource usage restriction and transferring that task to a different host 170M where its execution is then resumed using resources 171M. For example, the task 175D may be migrated to a host 170M with greater resources or a host that has more available resources. The host 170A from which the task 175D was migrated may be left with more available resources for execution of other tasks.

Figure 4C:
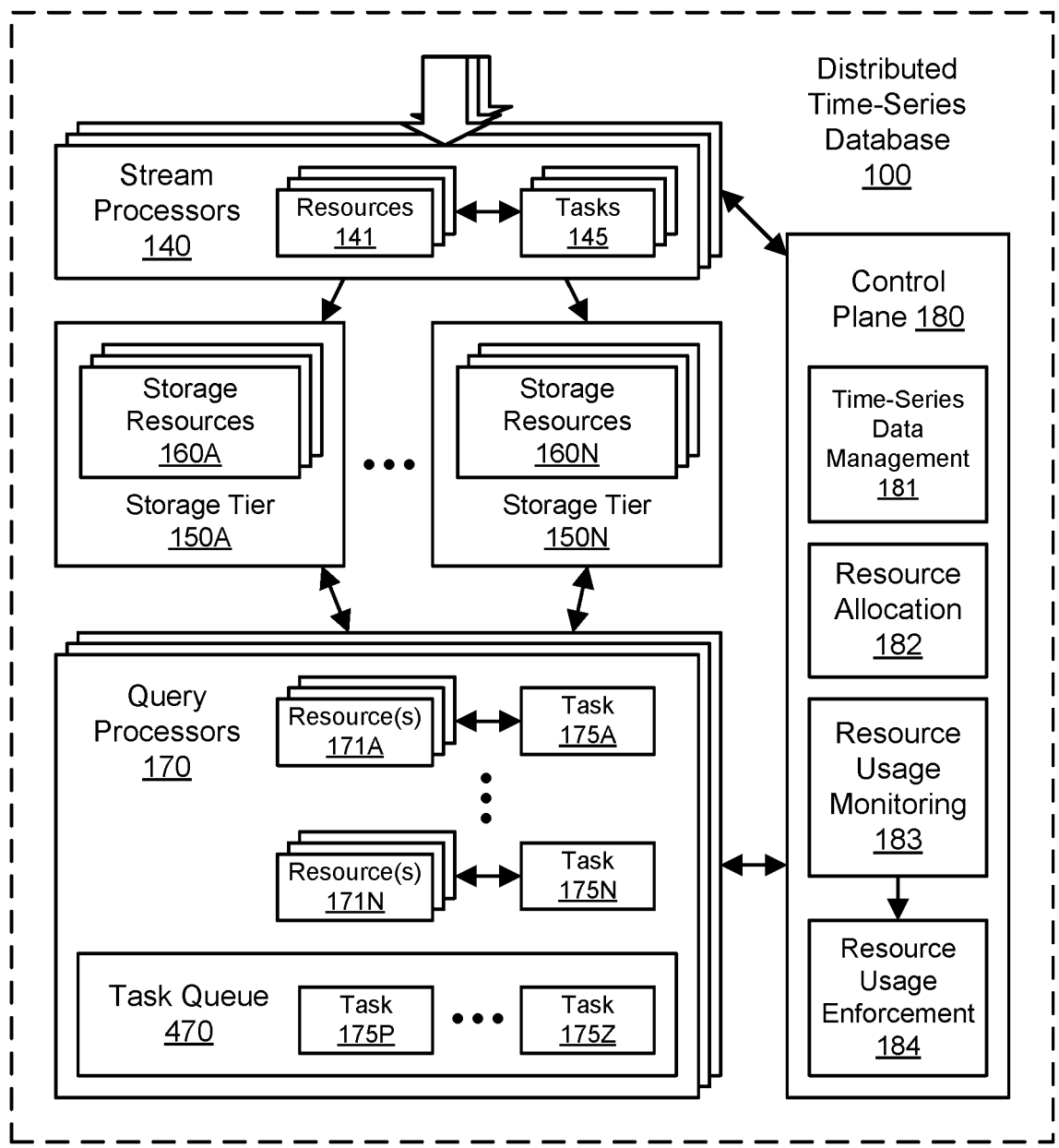
FIG. 4C illustrates further aspects of the example system environment for resource usage restrictions in a time-series database, including delaying of tasks performed by query processors, according to some embodiments.

FIG. 4C illustrates further aspects of the example system environment for resource usage restrictions in a time-series database, including delaying of tasks performed by query processors, according to some embodiments. In one embodiment, using a component 184 for resource usage enforcement, actions such as task throttling may be taken to prevent other tasks from being negatively affected by the excessive resource usage of one task. As shown in the example of FIG. 4C, a set of query processors 170 may be used for concurrent execution of a set of tasks including tasks 175A through 175N. Task 175A may consume a set of resources 171A, and task 175N may consume a set of resources 171N. The resource usage monitoring 183 may determine that one or more tasks associated with a given client or a given time series are consuming an excessive amount of resources relative to one or more resource usage restrictions associated with that client or time series. The database 100 may throttle or delay additional tasks associated with that client or time series to enforce the resource usage restriction(s). As shown in FIG. 4C, a task queue 470 may be associated with the fleet of query processors 170. The task queue 470 may store any tasks such as task 175P through task 175Z whose execution is being delayed, e.g., to enforce resource usage restrictions. Task throttling may involve delaying execution of a task, e.g., until a total resource usage for a given client or given time series has dropped sufficiently. Task throttling may be performed to enforce client-based usage restrictions for multiple tasks requested by the same client and/or time-series-based usage restrictions for multiple tasks requested for the same time series.

Figure 5:
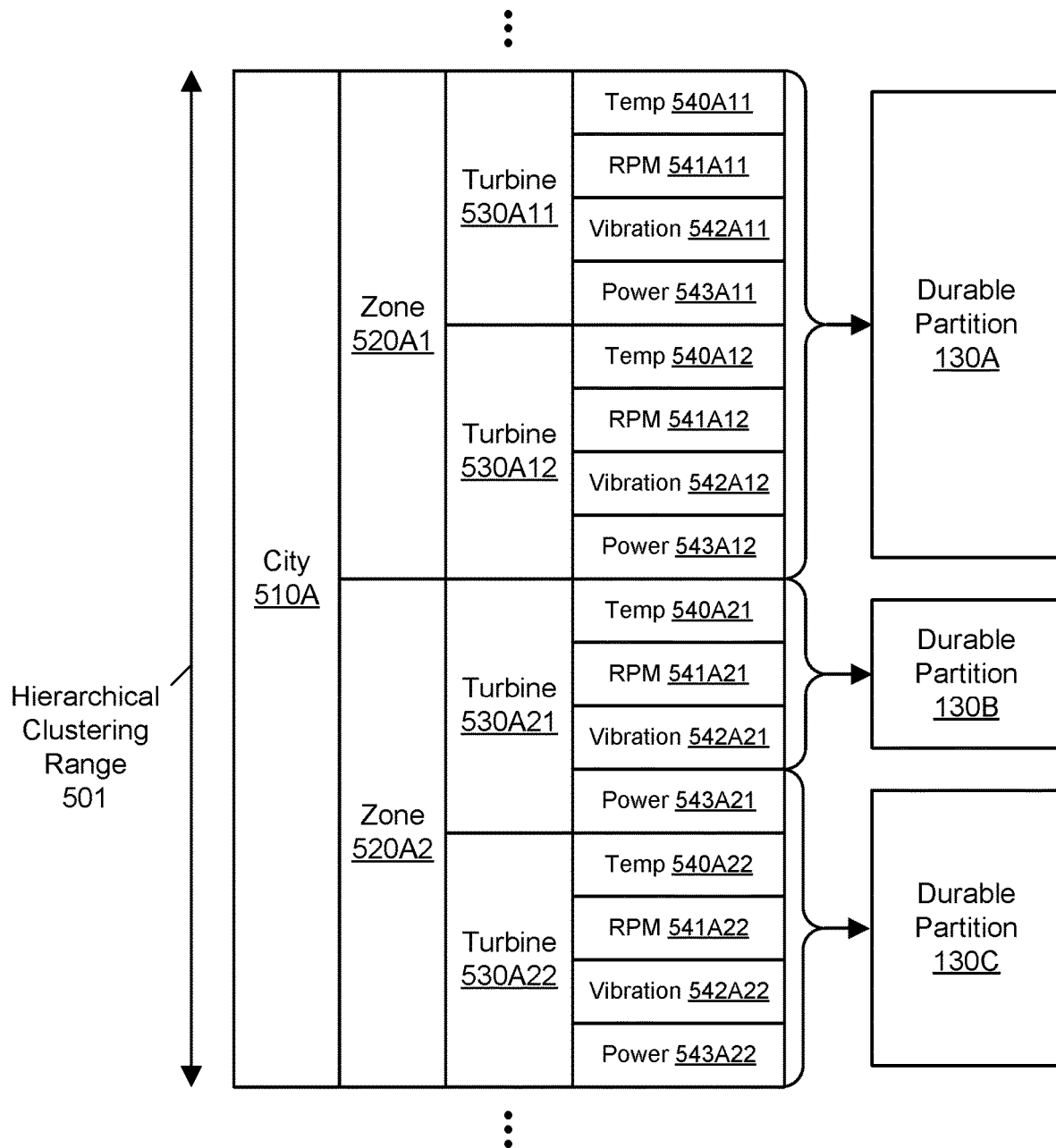
FIG. 5 illustrates further aspects of the example system environment for resource usage restrictions in a time-series database, including hierarchical clustering of ingested time-series data, according to one embodiment.

FIG. 5 illustrates further aspects of the example system environment for resource usage restrictions in a time-series database, including hierarchical clustering of ingested time-series data, according to one embodiment. The ingestion routers 110 may organize time-series data along a hierarchical clustering range 501. Some time series may be related to other time series via a hierarchy. Using hierarchical clustering, related time series may be placed near each other throughout their lifecycle in the time-series database 100. The use of hierarchical clustering may achieve a higher degree of compression for time-series data as well as lower latency for queries. The hierarchy may be specified by clients 190 or may be inferred automatically using contextual information, such as the geographical proximity of different time series, the generation of different time series by the same client device, and so on. The ingestion routers 110 may tag incoming data points so that hierarchically related series are co-located properly. A hash-based clustering scheme may be used at various stages of the database 100 to enforce the hierarchical clustering.

As shown in the example of FIG. 5, an example of a hierarchical relationship path for client devices representing wind-turbine sensors may be Country, State, City, Zone, Wind Turbine, and Metric. A portion of data having this hierarchical scheme may include data for a particular city 510A, two zones 520A and 520A32, and two turbines per zone 530A11, 530A12, 530A21, and 530A22. Turbine 530A11 may include measurements for temperature 540A11, RPM 541A11, vibration 542A11, and power 543A11. Turbine 530A12 may include measurements for temperature 540A12, RPM 541A12, vibration 542A12, and power 543A12. Turbine 530A21 may include measurements for temperature 540A21, RPM 541A21, vibration 542A21, and power 543A21. Turbine 530A22 may include measurements for temperature 540A22, RPM 541A22, vibration 542A22, and power 543A22. A hash-based clustering scheme supporting this hierarchy may co-locate all measurements for a given wind turbine, all wind turbines for a given zone, and so on. In one embodiment, all metrics of all wind turbines in a zone/city/state may be clustered together. In one embodiment, the hierarchical clustering may be changed over time and in response to query workloads in order to reduce the latency of queries. For example, the example data of FIG. 5 may be reorganized (for future data points) with temp, RPM, vibration, and power as higher-level constructs than the turbine identifiers.

The data points for the hierarchy shown in FIG. 5 may be mapped to various durable partitions by the ingestion routers 110. As shown in the example, the time-series data may be mapped and routed to partitions 130A, 130B, and 130C. In one embodiment, different numbers of time series may be mapped to different partitions based (at least in part) on the ingestion rate of those time series. Partitions may be split or merged as appropriate to adapt to changing ingestion rates for various time series. Each durable partition may support streaming. A particular partition may be mapped to a particular stream processor, e.g., for writing data from the partition to a particular storage tier. In one embodiment, partitions 130A-130C may represent shards of a streaming service 120. In one embodiment, partitions 130A-130C may represent database tables or other durable storage resources.

Figure 6:
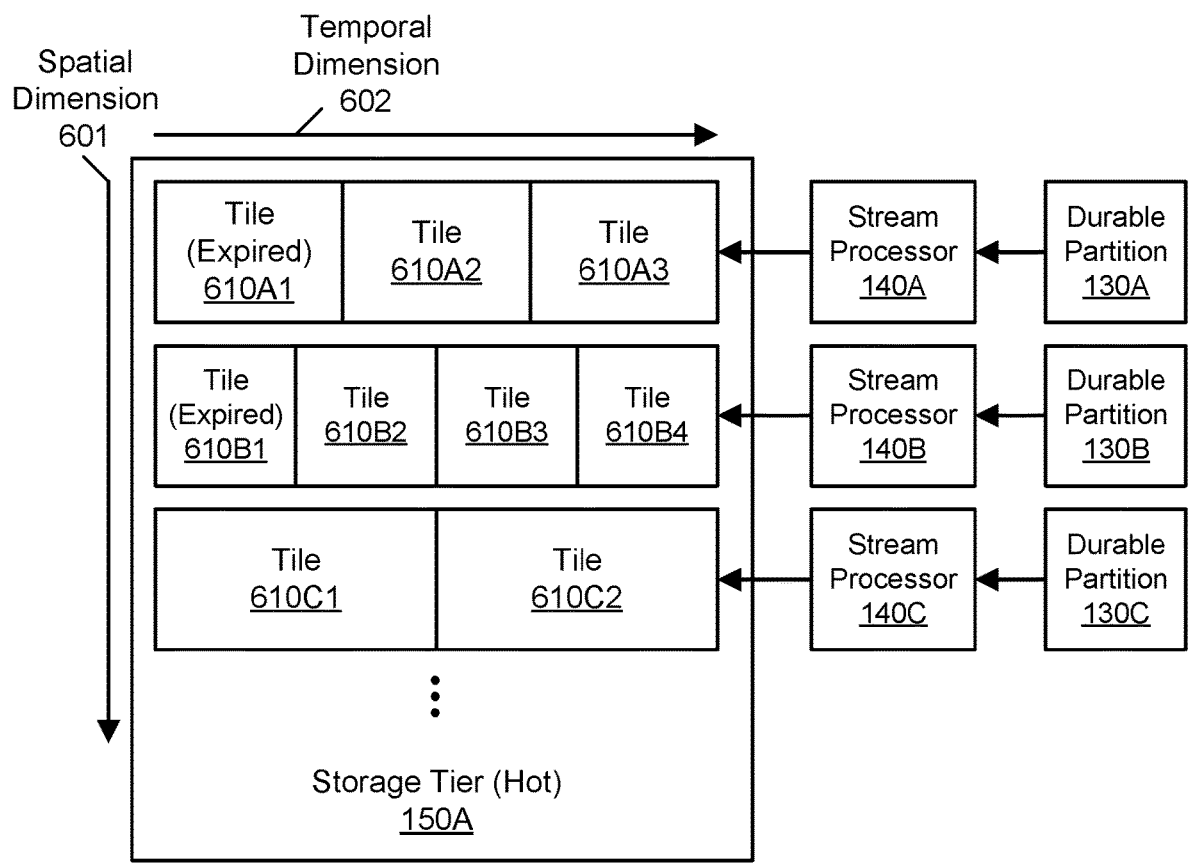
FIG. 6 illustrates further aspects of the example system environment for resource usage restrictions in a time-series database, including storage of time-series data using two-dimensional tiles in a hot tier, according to one embodiment.

FIG. 6 illustrates further aspects of the example system environment for resource usage restrictions in a time-series database, including storage of time-series data using two-dimensional tiles in a hot tier, according to one embodiment. As discussed above, the database 100 may include a hot storage tier such as tier 150A that stores recent data with high availability and low latency. In one embodiment, the hot tier 150A may include a set of storage hosts or storage nodes that include computational resources and memory resources. The storage nodes may store time-series data using tiles that are generated or appended to by stream processors. Tiles may be stored using storage resources such as memory (e.g., RAM) and/or solid-state drives for lower latency of storage and retrieval. Tiles may be replicated across different nodes (e.g., in different data centers or availability zones) for improved durability. Tiles may be partitioned along non-overlapping spatial boundaries, e.g., such that time-series data from one time series is assigned to one tile while time-series data from another time series is assigned to another tile. However, a tile may hold one or more time series. The spatial range may be based on hierarchical clustering that seeks to co-locate related measurements and/or time series in the same partition, and the hierarchical clustering may be performed by the ingestion routers 110. Tiles may also be partitioned along non-overlapping temporal boundaries. Due to the spatial dimension 601 and the temporal dimension 602, tiles may be said to be two-dimensional. The two-dimensional partitioning represented in tiles may be decoupled from the partitioning of the ingestion stage due to the difference in write latency between the stages. The same partitioning scheme may be used, but the partition ranges may differ.

In the example of FIG. 6, a set of time series may be mapped to durable partitions 130A, 130B, and 130C based on a spatial range (e.g., hierarchical clustering). Particular partitions may be mapped to particular stream processors for writing data from the partitions to the hot tier 150A. For example, partition 130A may be assigned to stream processor 140A that writes to the hot tier, partition 130B may be assigned to stream processor 140B that writes to the hot tier, and partition 130C may be assigned to stream processor 140C that writes to the hot tier. For a given time series or partition, tiles representing older windows of time may be termed "closed," while a tile representing a current window of time may be termed "open." Tiles may be closed when the amount of data reached a threshold or when a maximum time interval is reached. For current data points (e.g., data not received out of order), the stream processor for a partition may write to an open tile. Out-of-order data may be routed to previously closed tiles in some circumstances. Tiles whose temporal boundaries are beyond the retention period (e.g., three hours) for the tier and table may be deemed expired and either deleted or marked for deletion. As shown in the example of FIG. 6, stream processor 140A may write to an open tile 610A3 that was preceded in time by a tile 610A2 that was preceded in time by a now-expired tile 610A. Similarly, stream processor 140B may write to an open tile 610B4 that was preceded in time by a tile 610B3 that was preceded in time by a tile 610B2 that was preceded in time by a now-expired tile 610B1. Additionally, stream processor 140C may write to an open tile 610C2 that was preceded in time by a tile 610C1. As discussed above, the contents of a tile may be replicated (e.g., using three replicas) across different location or zones to achieve greater durability of the hot tier.

Illustrative Computer System

In at least some embodiments, a computer system that implements a portion or all of one or more of the technologies described herein may include a computer system that includes or is configured to access one or more computer-readable media. FIG. 7 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more storage tiers of a time-series database;
one or more stream processors of the time-series database, the one or more stream processors configured to store, into the one or more storage tiers, elements of a plurality of time series associated with a plurality of clients of the time-series database, wherein the one or more stream processors are further configured to perform a plurality of calculations on a plurality of the time series, wherein the calculations are requested by a plurality of the clients of the time-series database, wherein the calculations generate a plurality of results, and wherein the calculations comprise a first calculation and a second calculation; and
a control plane comprising one or more processors and a memory to store computer-executable instructions that, if executed, cause the one or more processors to:
receive a request from a first one of the plurality of clients of the time-series database to perform the first calculation on a first time-series associated with the first client of the time-series database;
receive a request from the first client or a second client of the plurality of clients of the time series database to perform the second calculation on the first time series or a second time series, wherein the first or second time series is associated with the first or second client of the time-series database;
determine one or more resource usage restrictions associated with the plurality of calculations;
determine a usage of one or more resources by the first calculation;

determine that the usage of the one or more resources by the first calculation violates at least one of the one or more resource usage restrictions; and based at least in part on the usage of the one or more resources by the first calculation, perform one or more actions to modify an execution of the first calculation, wherein the one or more actions increase an amount of the one or more resources available to the second calculation.

2. The system as recited in claim 1, wherein the one or more actions to modify the execution of the first calculation comprise termination of the first calculation or migration of the first calculation from a first stream processor to a second stream processor.

3. The system as recited in claim 1, wherein the control plane stores additional computer-executable instructions that, if executed, cause the one or more processors to:

allocate one or more resources usable by the second calculation according to the one or more resource usage restrictions.

4. The system as recited in claim 1, wherein the first calculation comprises a continuous query, and wherein the continuous query is performed repeatedly based at least in part on a schedule.

5. A method, comprising:

receiving one or more client requests from one or more clients of a time-series database to perform a first task and a second task on one or more of a plurality of time series;

storing, into one or more storage tiers of the time-series database, elements of the plurality of time series associated with a plurality of clients of the time-series database, including the one or more clients of the time series database;

initiating execution of a plurality of tasks, wherein the plurality of tasks are executed using one or more resources of one or more hosts, wherein at least a portion of the elements of the plurality of time series represent one or more inputs to the plurality of tasks, and wherein the plurality of tasks comprise the first task and the second task;

determining that a usage of the one or more resources by the first task exceeds one or more resource usage restrictions; and based at least in part on the usage of the one or more resources by the first task, performing one or more actions that increase an amount of the one or more resources available to the second task.

6. The method as recited in claim 5, further comprising:

allocating one or more additional resources of the one or more hosts according to the one or more resource usage restrictions, wherein one or more additional tasks are performed using the one or more additional resources.

7. The method as recited in claim 6, wherein the one or more additional resources comprise a memory resource comprising an upper bound.

8. The method as recited in claim 6, wherein the one or more additional resources comprise a virtual machine configured to perform one or more of the tasks.

9. The method as recited in claim 5, wherein the one or more actions comprise termination of the first task.

10. The method as recited in claim 5, wherein the one or more actions comprise migration of the first task from a first one of the hosts to a second one of the hosts.

11. One or more non-transitory computer-readable storage media storing program instructions that, when executed on or across one or more processors, perform:

receiving one or more client requests from one or more clients of a time-series database to perform a first task and a second task on one or more of a plurality of time series;

storing, by one or more hosts into one or more storage tiers of the time-series database, elements of the plurality of time series associated with a plurality of clients of the time-series database, including the one or more clients of the time-series database;

initiating execution of a plurality of tasks, wherein the plurality of tasks are executed using one or more resources of the one or more hosts, wherein at least a portion of the elements of the plurality of time series represent one or more inputs to the plurality of tasks, and wherein the plurality of tasks comprise the first task and the second task;

determining, by a control plane, that a usage of the one or more resources by the first task violates one or more resource usage restrictions; and based at least in part on the usage of the one or more resources by the first task, performing one or more actions to modify the execution of the first task such that degradation of the execution of the second task is reduced.

12. The method as recited in claim 5, wherein the tasks comprise a continuous query, wherein the continuous query is performed a plurality of times based at least in part on a schedule.

13. The method as recited in claim 11, further comprising:

determining that a resource usage by one or more tasks requested by an individual client of the one or more clients of the time-series database exceeds the one or more resource usage restrictions; and delaying execution of one or more additional tasks requested by the individual client based at least in part on the resource usage.

14. The one or more non-transitory computer-readable storage media as recited in claim 11, further comprising additional program instructions that, when executed on or across the one or more processors, perform:

allocating, by the control plane, one or more additional resources of the one or more hosts according to the one or more resource usage restrictions, wherein one or more additional tasks are performed using the one or more additional resources.

15. The one or more non-transitory computer-readable storage media as recited in claim 14, wherein the one or more resources comprise a storage resource comprising an upper bound.

16. The one or more non-transitory computer-readable storage media as recited in claim 11, wherein the one or more actions comprise termination of the first task.

17. The one or more non-transitory computer-readable storage media as recited in claim 11, wherein the one or more actions comprise migration of the first task from a first one of the hosts to a second one of the hosts.

18. The one or more non-transitory computer-readable storage media as recited in claim 11, further comprising additional program instructions that, when executed on or across the one or more processors, perform:

determining that a resource usage by one or more tasks requested by an individual client of the one or more clients of the time-series database exceeds the one or more resource usage restrictions; and delaying execution of one or more additional tasks requested by the individual client based at least in part on the resource usage.

19. The one or more non-transitory computer-readable storage media as recited in claim 11, further comprising additional program instructions that, when executed on or across the one or more processors, perform:
- determining that a resource usage by one or more tasks associated with an individual time series of the time-series database exceeds the one or more resource usage restrictions; and
- delaying execution of one or more additional tasks associated with the individual time series based at least in part on the resource usage.

20. The one or more non-transitory computer-readable storage media as recited in claim 11, further comprising additional program instructions that, when executed on or across the one or more processors, perform:
- determining, by the control plane, a predicted resource usage of an additional task; and
- allocating, by the control plane, one or more additional resources of the one or more hosts according to the predicted resource usage and according to the one or more resource usage restrictions, wherein the additional task is performed using the one or more additional resources.

* * * * *